July 3, 1934.  W. GEBHARDT  1,965,460
PECAN CRACKING MACHINE
Filed Nov. 7, 1932  5 Sheets-Sheet 3

Inventor
William Gebhardt,
By Christian R. Nielsen.
Attorney

July 3, 1934.  W. GEBHARDT  1,965,460
PECAN CRACKING MACHINE
Filed Nov. 7, 1932   5 Sheets-Sheet 5

Inventor
William Gebhardt,
By Christian K. Nielsen,
Attorney

Patented July 3, 1934

1,965,460

UNITED STATES PATENT OFFICE 1,965,460

PECAN CRACKING MACHINE

William Gebhardt, San Antonio, Tex.

Application November 7, 1932, Serial No. 641,659

12 Claims. (Cl. 146—12)

My invention relates to nut cracking machines and more particularly to a machine for cracking pecans and it consists in the constructions, arrangements and combinations herein described and claimed.

It is a principal object of my invention to provide a nut cracking mechanism which will be automatic in its adjustment to the varying length of nuts fed to the cracking mechanism, as well as providing novel means for successively feeding individual nuts to the cracking mechanism.

It is also an important object of the invention to provide novel clamp means for holding a nut in operative position for action by the cracking mechanism, as well as providing means for releasing the cracked nut, each of which operations is effected in an automatic manner.

Additional objects, advantages and features of invention will appear from the following description and accompanying drawings, forming a part of this application, wherein.

In carrying out my invention I provide a suitable base 10 having supporting legs 11, the upper side of the base including an integrally formed upstanding flange 12 for support of a feeding mechanism, presently to be described. The base 10 comprises a table portion 13 cut away as at 14 to accommodate a nut feeding mechanism, generally indicated at 15. The cut away portion of the table extends from the end 16 of the base and stops short of the opposite end of the table to provide a platform 17 for support of mechanism to be described.

A side frame 18 is bolted to the base adjacent the platform 17 and end 16, as indicated at 19.

Thus, the base 10 is partly open upon its upper surface and within this opening there is mounted a feed hopper 20. The feed hopper 20 includes mounting flanges 21 adapted to rest upon the table 13 and is secured by bolts 22.

The hopper 20 includes an inclined bottom wall 23 which cooperates with a grate 24 for feeding the nuts by gravity to the nut feeding mechanism 15. It will be apparent that the grate functions to permit separation of foreign matter from the nuts contained within the hopper.

In order to insure a proper level of nuts at the point of pick-up by the nut feeding mechanism, a deflector plate 25 is secured to the forward wall 26 of the hopper. The deflector plate 25 is so inclined as to maintain a level of pecans which will be most effective for nut pick-up spoons.

The feed mechanism is in the form of a revolving wheel embodying radially spaced arms so shaped as to pick up and deliver a single pecan to the cracker mechanism, as will now be described in detail, reference being made particularly to Figures 5 and 6.

Figure 6:
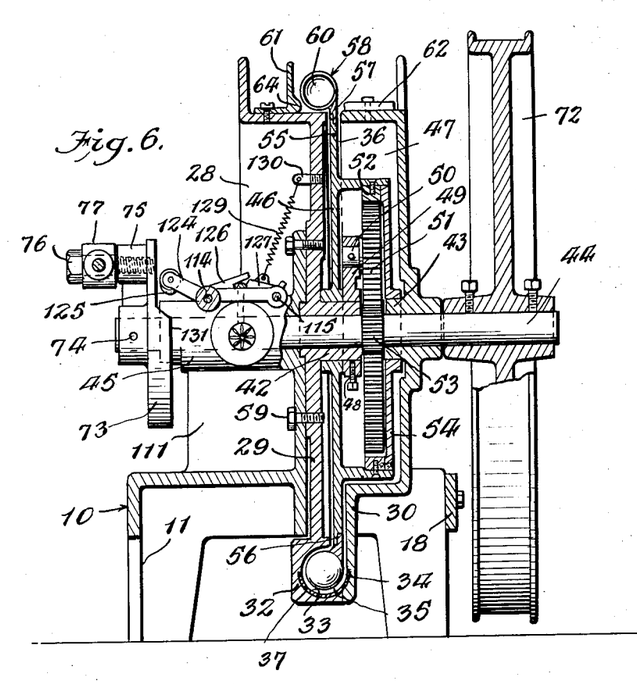
Figure 6 is a vertical section on the line 6—6 of Figure 1.

As clearly shown in Figure 6, a casing 28 is provided, formed in two sections 29 and 30, each of which are provided with ears 31 for reception of bolts for securing the sections together. The sections 29 and 30 are substantially circular in plan view and the section 29 has formed at a point adjacent its outer periphery an enlargement 32, within which there is formed a semicircular groove 33. The section 30 also is formed with a slight curved portion 34 which will align with the groove 33 when the sections are bolted together, thus forming a substantially circular passage-way 35 for passage of the pick-up spoons of the feed wheel during rotation thereof. The inner faces of the sections 29 and 30 are in spaced relation, as indicated at 36, forming a guide passage for the pick-up spoons.

The passage-way 36 does not continue throughout the circumference of the sections 29—30 but begins at a point A at the upper part of the casing and stops at a point B at the lower part of the casing. The throat 27 is defined by the sections 29—30 and is preferably lined with a polished steel plate 37 which may be removably attached to the sections so as to be readily replaceable. As clearly shown in Figure 5, the innermost portion 38 defining one wall of the passage-way is offset as at 39 adjacent the throat 27, thereby providing a shoulder 40 acting to retard an excess feed of nuts into the throat proper.

Figure 2:
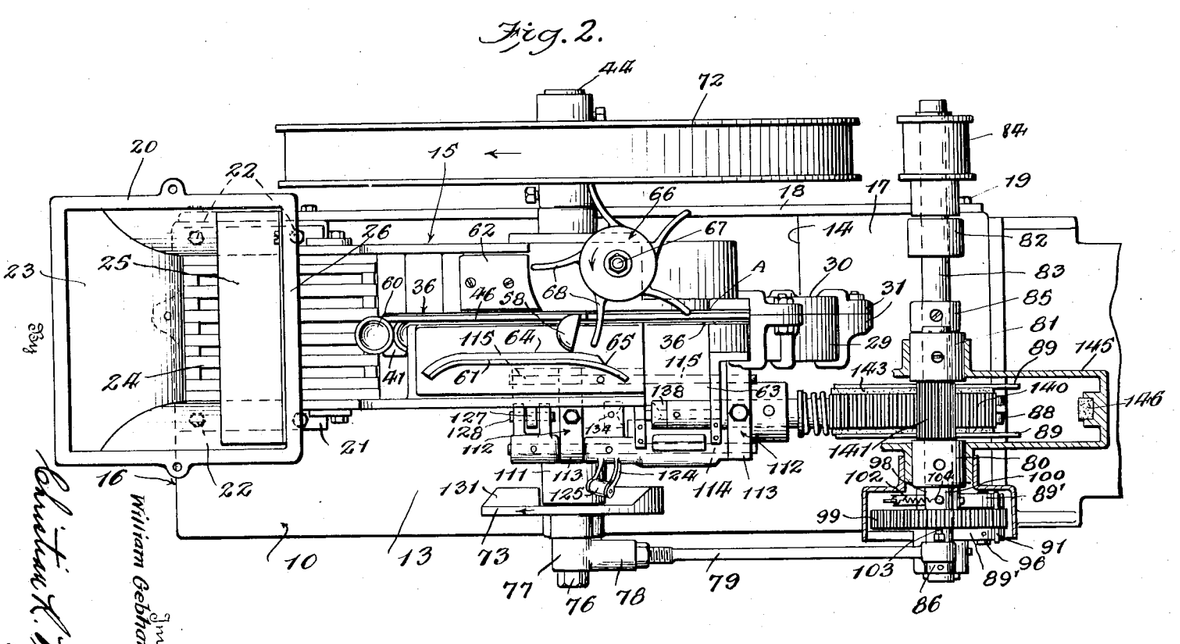
Figure 2 is a top plan view thereof partly in section.

Attention is now invited to Figure 2 of the drawings, wherein it will be seen that the section 29 has an opening 41 in its upper rear side by virtue of which the pick-up spoons may swing outwardly of the sections 29 and 30, so as to deposit the nuts picked up by the spoons into the cracking mechanism, which is located exteriorly of the casing 28.

The sections 29 and 30 each have hub portions 42 and 43 apertured to receive a drive shaft 44 which is of a length to project through a bearing 45 formed integrally with the table 13 and flange 12. Upon the hub 42 there is revolubly mounted a drum 46 of a size to be received within a circular chamber 47 of the section 30, and keyed to the hub as at 48, there is an arm 49 apertured for reception of a stud shaft 50 which may be pinned or otherwise keyed thereto. The shaft 50 revolubly supports a spur gear 51 which is in mesh with a ring gear 52 fixed to the inner periphery of the drum 46 and a small spur gear 53 keyed to the shaft 44. As shown, the drum 46 is closed by a removable plate 54 suitably journalled to receive the hub 43.

In order to mount the nut pick-up spoons the drum 46 has a plurality of radially projecting arms 55, suitably rabbeted at their ends as at 56, and within these rabbeted portions a stem 57 of a spoon 58 is secured. In practice, it has been found desirable to rabbet the stem 57 of the spoon so as to seat within the rabbet of the arm and secure them by means of a rivet and spot welding.

The combined length of the arms 55 and spoons 58 is such that the spoons will travel through the circular passage formed by the two sections 29 and 30, at their lower parts, and traverse a path outwardly of the sections 29 and 30 at their upper portions.

The section 29 is apertured and these apertures are aligned with apertures formed in the flange 12 for securing the casing 28, by bolts 59, securely to the base 10.

From the foregoing, it will be clearly apparent that when the shaft 44 is rotated the small gear 53 will impart movement to the gear 51 which in turn will cause rotation of the drum 46 by virtue of its engagement with the ring gear 52.

The pick-up spoons 58 are preferably offset from the arms 55 so as to overlie the section 29 of the casing and are suitably cupped as at 60, to effectively support a nut in its removal from the hopper.

Guide members 61 and 62 are secured to the sections 29 and 30, respectively, in order to insure retention of the nut within the spoons during their upward travel. The guide 61 extends from a point closely adjacent the opening 41 to the discharge chute 63 which delivers the nut to the cracking mechanism, and preferably embodies a semi-circular rib 64. The guide 61 is slightly curved as at 65 in the direction of the discharge chute and the rib 64 stops short of this curved portion. The rib 64 in the shape shown and described is free of angularities which might tend to retard progress of a nut supported by the spoons, and this avoids jamming the nut between the spoons and the guide 61.

I have provided a wheel 66 revolubly mounted upon a vertical stud 67 fixed at the upper portion of the section 30. The wheel 66 is mounted opposite the discharge end of the guide 61 and includes radially extended curved arms 68. The arms 68 are of a length to lie directly in the path traversed by the spoons 58 so that nuts carried by the spoons will impinge thereagainst. The wheel 66 should not rotate too freely, and in order to regulate movement of the wheel I provide a friction disk 69 positioned upon the shaft 67 and in bearing contact with the upper surface of the wheel. The frictional contact between the wheel and disk may be regulated by tightening of the nut 70 to vary the tension of the spring 71.

It will be apparent from the foregoing that any tendency for a nut to become dislodged from the spoon until it has reached a point directly over the chute is avoided. The drive for the nut feeding mechanism and the cracking mechanism must operate in synchronism, and I prefer to effect such operation by the following mechanism: Upon one end of the shaft 44 I have illustrated a belt pulley 72 keyed thereto, while upon the opposite end of the shaft a cam wheel 73 is journalled and keyed, as at 74. The cam wheel includes a threaded boss 75 receiving a wrist pin 76. The wrist pin 76 loosely mounts a collar 77 having an extension 78 interiorly threaded to receive a connecting rod 79.

The base 10 at the end opposite the feed hopper is provided with vertically disposed bearings 80, 81 and 82 suitably spaced across the end of the table 13, and revolubly support a shaft 83. The shaft 83 projects a substantial distance from the outermost bearings 81 and 82 and upon one end has keyed thereon an idler pulley 84 which is aligned with the belt pulley 72. The drive for the pulley 72 may be in the form of an electric motor (not shown) but preferably will include a belt pulley and belt, the belt running over the idler pulley 84 and thence around the pulley 72. End thrust of the shaft 83 may be avoided by securing a thrust collar 85 thereto in such position as to contact the bearing 81. The shaft 83 preferably occupies a position closely above the table 13, as is clearly shown in Figure 5, and that end of the shaft projecting beyond the bearing 80 has pinned thereto a crank arm 86 apertured at its outer end for connection to the connecting rod 79 as at 87. A sector-shaped plate 88 is fixed to the shaft 83 and upon opposite sides of this plate there are rigidly secured drive plates 89. Between ears 89' formed upon the hub of the arm 86 a segmental gear 90 is pivotally mounted. The gear 90 carries a transversely disposed pin 91 which normally seats in a recess 92 in the upper portions of the plates 88 and 89. Thus the gear 90 will be held against rocking movement in one direction upon seating of the pin within the recesses of the plates. At the end opposite the pin 91 the under face of the gear 90 is provided with a recess 93 in opposed relation to a similar recess 94 and confined between these recesses there is a helical spring 95. The pivot 96 of the gear 90 is offset from the medial portion thereof, and the spring 95 exerting an upward lift to the long portion 97 of the gear, the pin will be caused to engage the recesses 92 to check further movement of the gear. It may be here stated that the gear 90 and its particular mounting form a part of the nut cracking drive mechanism, as will be more clearly apparent as the description proceeds. Directly above and parallel with the shaft 83 there is a second shaft 98 journaled in the upper portions of the bearings 80 and 81 (see Fig. 2). A large spur gear 99 is mounted upon the shaft 98 and is so positioned as to align with the segmental gear 90, for intermeshing relation therewith at times.

The gear 99 is fixed to the shaft 98 so as to cause rotation thereof, but I provide a lost-motion connection therebetween, as will now be described. The gear 99 includes a hub 100 which has diametrically opposite apertures 101 and through these apertures and an aperture formed in the shaft 98 I provide a pin 102 of substantial thickness. The apertures 101 are of greater width than the diameter of the pin, for a purpose that will presently be described. The pin 102 may be secured in place by a set screw 103 threaded through a suitable aperture in the end of the shaft 98 and of a length to impinge upon the pin. The pin 102, as clearly shown in Figure 5, extends beyond the hub 101 a substantial distance and between the extremity thereof and an upstanding pin 104. Fixed in the hub 100 there is a helical spring 105, which functions to hold the pin 102 in contact with one side of the apertures 101.

From the structure thus far described, it will be apparent that the shaft 98 will not be caused to rotate until the gear 99 has moved a substantial distance in order to move the hub 100 a sufficient distance to cause the opposite sides of the apertures 101 to engage the pin 102. This lost-motion is necessary in order to insure substantially full engagement of the teeth between the segmental gear 90 and gear 99.

Figure 3:
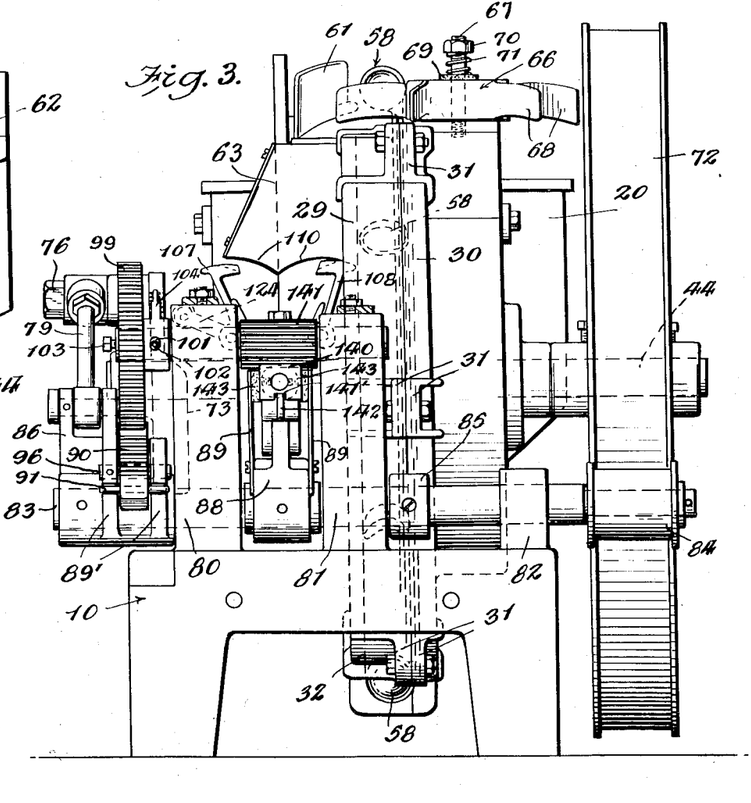
Figure 3 is an end elevation thereof.

The chute 63 may be formed as an integral part of the section 29 or formed separately and bolted thereto, and as viewed in Figure 3, extends outwardly from the section 29 at a suitable angle so as to cause the pecans to feed by gravity to a pair of nut-receiving arms 107 and 108 disposed immediately beneath the discharge end 109 of the chute. The discharge end of the chute is provided with arcuate portions 110 so shaped as to permit the arms 107—108 to swing into nut-receiving position therebeneath.

Figure 4:
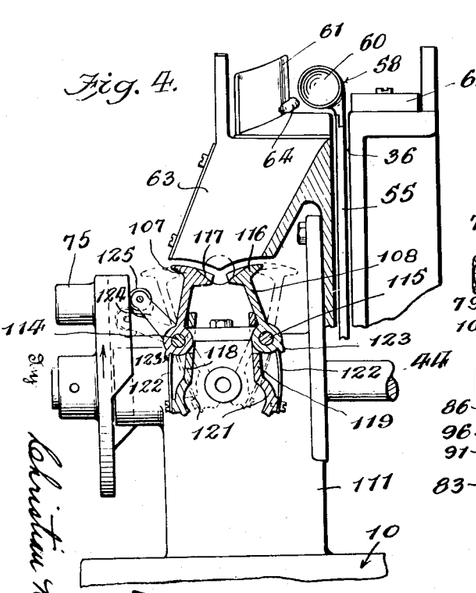
Figure 4 is a fragmentary vertical section illustrating the nut clamping jaws and operating means therefor.

The arms are arranged in opposed relation and are adapted to swing inwardly and outwardly from a position beneath the discharge end of the chute, as shown in solid and dotted lines in Figure 4.

Upon the upper surface of the bearing 111 there are provided a pair of bearing blocks 112 spaced in advance and to the rear of the chute 63 and these blocks having bearings 113 in which there is loosely mounted shafts 114—115. These shafts 114—115 are positioned a suitable distance below the chute 63 and form the supporting means for the arms 107—108 as well as their operating means, as will now be described. Upon respective shafts 114—115 I mount the upwardly extended nut-receiving arms 107—108, the arms being positioned upon the shafts so as to be disposed directly beneath the discharge end of the chute 63, and normally occupy the position shown in Figures 4 and 7, so as to receive a nut discharged from the chute. The arms comprise a head portion 116, the upper surface of which is cut away as at 117 to form a temporary seat for a nut to be passed to the cracking machine.

A pair of nut gripping arms 118 and 119 are loosely mounted upon respective shafts 114—115 by ears 120, the arms depending downwardly from the shafts. The lower free ends of the arms 118—119 are slightly curved outwardly as at 121 so as to readily grip a nut when positioned between the arms.

Figures 7, 8, 9:
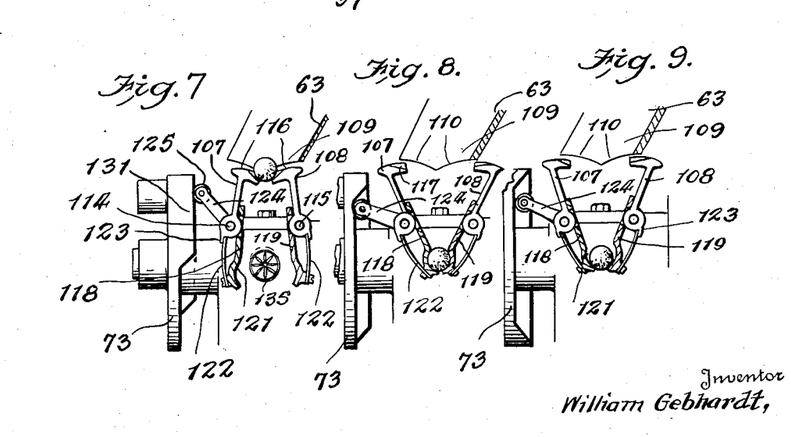
Figure 7 illustrates the position of the nut jaws in one operation of the machine.
Figure 8 is a similar view illustrating an intermediate position of the jaws.
Figure 9 is a similar view illustrating the lower jaws in partly opened position, just prior to release of the nut.

One end of respective leaf springs 122 is riveted to each of the arms 118—119, the free ends of the springs being positioned beneath respective lugs 123 formed upon the bearings of the arms 107 and 108. The springs 122 normally hold the arms 107—108 in nut-receiving position and the arms 118—119 in their extreme outer positions as shown in Figures 4 and 7.

The arms 107—108 and the arms 118 and 119 are operated in unison, which is effected in the following manner. The arm 107 has formed integrally therewith a trip lever 124 upon the free end of which there is mounted a roller 125. The lever 124 is of a length to position the roller so that it will engage the cam 73 during rotation thereof. The shaft 114 has fixed thereto a fork 126 and upon the shaft 115 there is keyed a lever 127. The lever 127 includes a pin 128 adapted to be received in the fork of the shaft 114. In order to maintain the fork and lever in normal position a helical spring 129 is fixed to the lever 127 and a stud 130 formed upon the section 29 of the casing, all of which is clearly shown in Figure 6. Obviously, when the high point 131 of the cam engages the roller 125 the arms 107—108 will be swung inwardly to a position beneath the chute to receive a nut therefrom. When the upper arms 107—108 are in the position just described, the lower arms 118—119 are in their opened positions.

Figure 5:
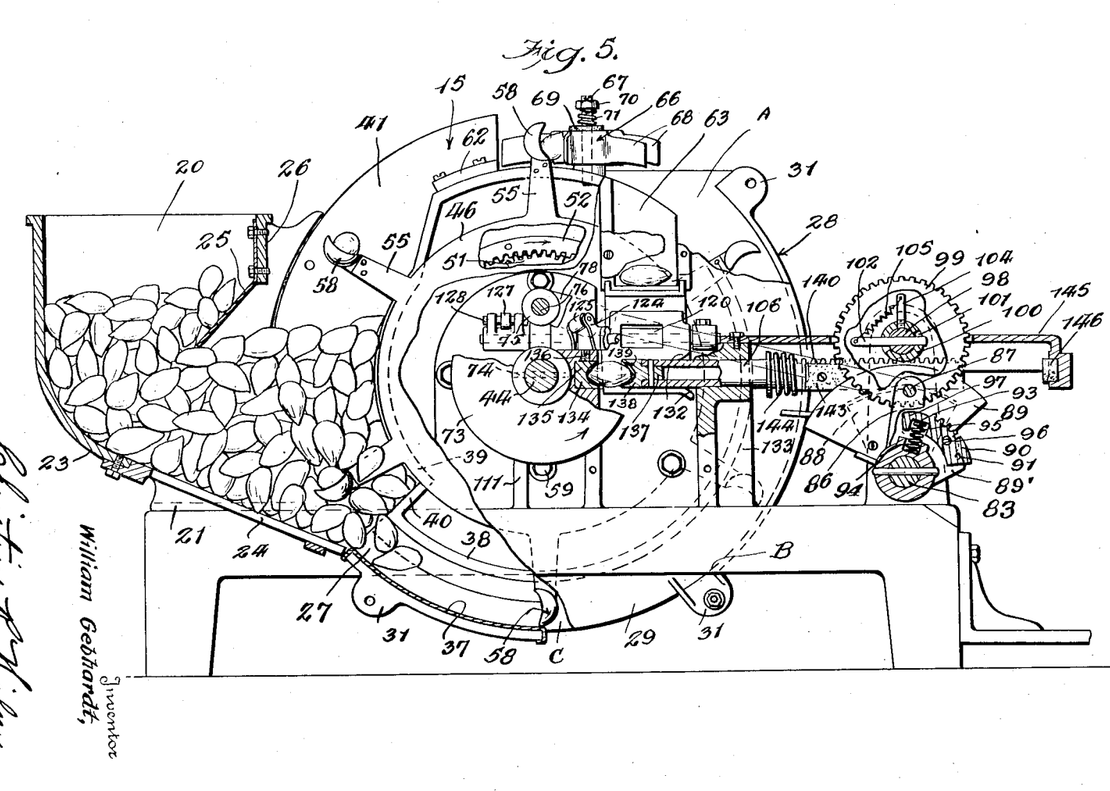
Figure 5 is a side elevation, partly in section, illustrating the feed mechanism, nut cracking mechanism and drive means.

The upper arms 107—108 and the lower arms 118—119 are of considerable width, as clearly shown in Figure 5, so that a pecan falling between either pair of the arms will be properly caught thereby. Upon the forward ends of the lower arms 118—119 are provided outwardly inclined faces 132, the object of which will be hereinafter described.

An upstanding bearing 133 is provided upon the base 10, and through this bearing there is reciprocably mounted the cracker plunger 106 The plunger 106 is in alignment with the inclined faces 132 of the arms 118 and 119, so that when the plunger is moved so as to engage the faces 132 the arms will be slightly separated, allowing the pecan to assume its cracking position.

A stationary nut cracking jaw 134 is mounted in the bearing slightly below this longitudinal center of the plunger 106, and preferably is formed with a hollow forward end 135 for the seating of one end of the pecan. As shown, the jaw is seated within an aperture formed in the bearing and held in place by a set screw 136.

In the present instance, I have illustrated the plunger 106 of hollow formation, in order to reduce the weight as much as possible, and within the forward end of the plunger there is riveted the shank 137 of a nut cracking jaw 138. The jaw 138 has a hollow end 139 similar to the one 135 for receiving the opposite end of a nut to be cracked, and is also slightly below the longitudinal center of the plunger. It has been found in actual practice that by offsetting the hollow ends or cavities 135—139 from the center line of thrust of the plunger, a more satisfactory crack of the nut is insured, especially where the nut is of less diameter than that of the plunger, which is generally the case.

The plunger 106 has formed upon its upper surface a rack bar 140 adapted to mesh with a gear 141 keyed to the shaft 98 and the under surface of the plunger is provided with a groove 141' receiving a rib 142 of the plate 88. By the construction just described it will be seen that the plate 88 supports the plunger 106 in its reciprocation, as well as preventing lateral motions thereof.

Friction pads 143 are fastened to the sides of the plunger 106 and the plates 89 are in forcible bearing contact therewith so that when the plates 89 are oscillated, the plunger will be caused to move, and this action will be dealt with more fully in the detailed explanation of the operation of the machine.

In order to provide means for adjusting the positive travel of the plunger 106, the link 79 as previously stated is provided with screw threads which are engaged with threads of the extension 78, and by screwing the link inwardly or outwardly of the extension 78, the link 79 will be shortened or lengthened as the case may be, and such adjustment of the link will cause a change in the position of the gear 90 and drive plate 89, increasing or decreasing positive the travel of the plunger.

Occasion may arise where one of the pick-up spoons 58 fails to deliver a nut to the cracker mechanism and in order to avoid locking action between the rack bar and segmental gear, I provide a spring 144, which as shown in Figure 5 is disposed upon the plunger 106 between the end of the rack bar 140 and the bearing 133. The spring 144 will prevent the plunger 106 from travelling beyond the point of safety, and in effect takes the place of a pecan should any of the spoons fail to pick up a nut.

As shown, a casing 145 is provided for enclosing the rack bar 140 and other associated parts and the rear of this casing is provided with a bumper 146 to check the backward movement of the plunger 106.

*The operation*

The operation will be readily understood from the following description. The pecans are fed into the hopper 20 in any approved manner, the deflector plate 25 insuring proper level of the pecans for most effective feeding. The drum 46 being rotated in a clock-wise direction, through suitable power applied to the drive wheel 72. The spoons 58 will be caused to travel through the pecans deposited above the throat 27, each spoon picking up a pecan and carrying it upwardly. The pecan will be retained within the spoon by the guides 61—62 until it engages the wheel 66. At this point, one of the blades 68 of the wheel will contact the pecan and shunt it into the chute 63. The pecan falls onto the nut-receiving arms 107—108 and is maintained in this position until released by the cam 73. Simultaneously with rotation of the drum 46 the cam 73 will be rotating in a counter-clockwise direction, causing the link 79 to be oscillated forwardly and backwardly, imparting a similar movement to the arm 86, the plates 89, and segmental gear 90.

Figure 1:
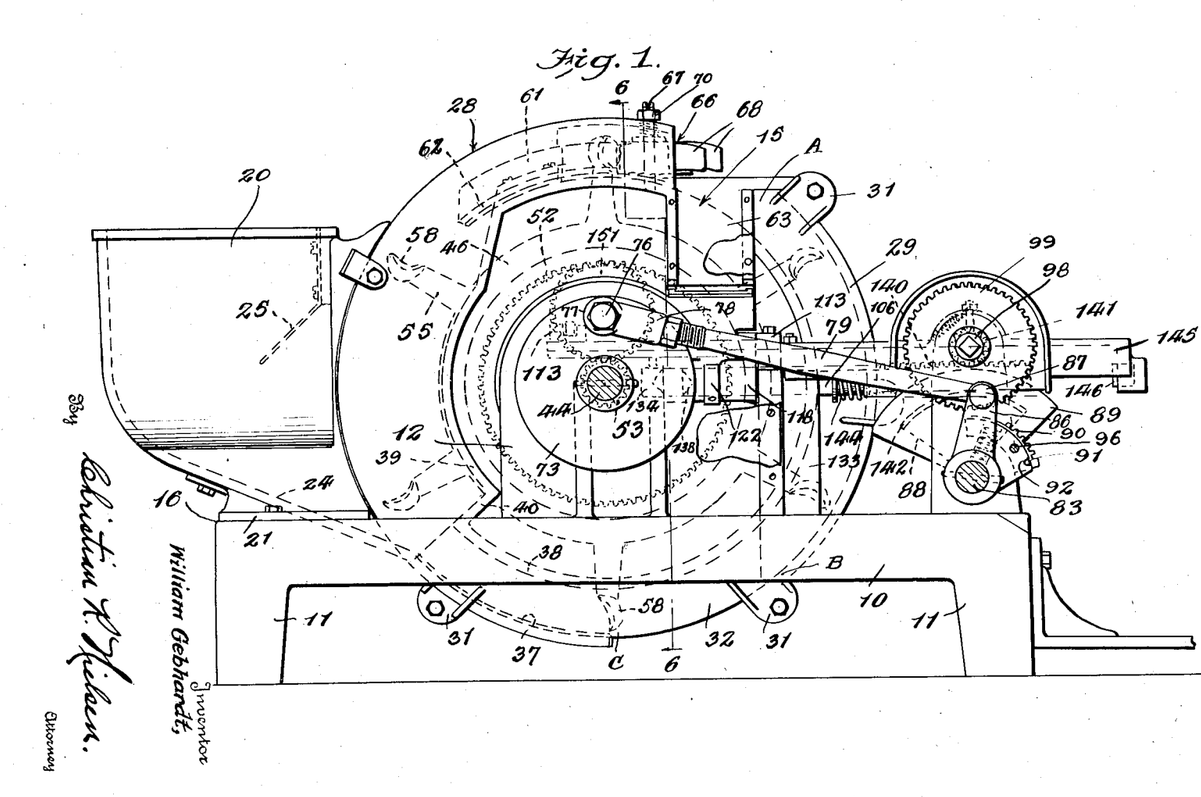
Figure 1 is a side elevation of a machine constructed in accordance with my invention.

Attention is now directed to Figures 1 and 5 of the drawings, wherein the link 79 is about to be moved in a direction toward the hopper 20. Therefore, since the segmental gear 90 is not engaged with the gear 99, movement will be imparted to the plunger 106 by virtue of the plates 89 and the friction pads 143. The cam 73 is also rotating during the above operations, and the roller following the contour of the cam will swing the arms 107—108 outwardly from beneath the chute 63, consequently releasing the pecan, allowing it to fall to be caught by the lower arms 118—119. The plunger 106 at this time enters the inclined faces 132 of the arms 118—119, slightly separating the arms, allowing the pecan to assume its normal cracking position, and the jaw 138 finally encounters the pecan causing it to seat in the stationary jaw 134. The movement of the plunger has been caused solely by frictional contact between the plates 89 and the friction pads 143 and as soon as the jaws 134—138 have fully engaged the nut the plunger ceases to move. Thus, pecans of various lengths may be accommodated in an entirely automatic manner. The segmental gear 90 continues to move, however, until the teeth thereof engage the gear 99 when a positive drive to the plunger is established, cracking the pecan.

It should be noted that the first teeth of the gear 90 when meshing with the gear 99 do not effect movement of the plunger but merely cause take-up of the lost-motion between the pin 102 and the slots 101, and it is only after such movement that the gear 90 begins to establish a positive drive, thus preventing the first teeth of the gear 90 from wearing out prematurely. Just when the cracking of the pecan commences, the lower arms 118—119 are opened, closing the upper arms 107—108 to receive the next pecan. After the pecan has been cracked, the plunger 106 returns to its normal rear position, when the operation described is repeated. Of course, when the pecan is cracked and the lower arms are opened, the nut falls into any suitable hopper or receptacle, not shown.

I claim:—

1. In a nut cracking machine, a feed mechanism comprising a revoluble drum having nut pick-up spoons, means for feeding nuts to said pick-up spoons, guide means for maintaining said nuts in said spoons during rotation of said drum, a chute for receiving nuts from said spoons, means for shunting nuts from said spoons into said chute, a pair of nut-supporting arms positioned beneath said chute to receive a nut discharged from said chute, a pair of nut-gripping arms associated with said first named arms to catch and retain a nut released by said supporting arms, means for operating said arms, a fixed jaw positioned in alignment with said gripping arms, a reciprocable jaw cooperable with said fixed jaw, friction means for moving said reciprocable jaw into engagement with a nut supported by said gripping arms and said fixed jaw, positive means for finally moving said reciprocable jaw to crack the nut and means for releasing the cracked nut.

2. In a nut cracking machine, a feed mechanism comprising a revoluble drum having nut pick-up spoons, hopper means for feeding nuts to said pick-up spoons, guide means for maintaining said nuts in said spoons during rotation of said drum, a chute for receiving nuts from said spoons, a revoluble bladed wheel positioned in the path of travel of said spoons for shunting the nuts into said chute, and nut cracking means positioned beneath said chute.

3. In a nut cracking machine, a feed mechanism comprising a revoluble drum having nut pick-up spoons, hopper means for feeding nuts to said pick-up spoons, guide means for maintaining said nuts in said spoons during rotation of said drum, a chute for receiving nuts from said spoons, shunt means cooperable with said spoons comprising a revoluble wheel having radially extended blades disposed in the path of said spoons and overlying said chute, friction means for retarding rotation of said wheel, and nut-cracking means positioned beneath said chute.

4. In a nut-cracking machine, a feed mechanism including a chute, a pair of oppositely rockable nut-supporting arms disposed therebeneath, a pair of oppositely rockable nut gripping arms depending from said first named arms, means for operating each pair of arms in unison, and nut cracking means cooperable with said nut-gripping jaws.

5. In a nut cracking machine, a feeder casing, a drive shaft, a drum revoluble thereon, said drum having nut pick-up spoons, a ring gear fixed to said drum, drive means between said shaft and said ring gear, a chute positioned to receive nuts from said pick-up spoons, a pair of rockable nut-supporting arms disposed beneath said chute and interconnected to rock said arms in opposite directions, a trip lever carried by one of said arms, a cam member fixed to said shaft and in bearing contact with said trip lever whereby to rock said arms, a pair of nut gripping arms rockably supported and depending beneath said first named arms and operable in unison with said supporting arms, a fixed nut cracking jaw positioned in alignment with said nut gripping jaws, a reciprocable plunger having a cracking jaw cooperable with said fixed jaw and slidable through said nut-gripping arms, friction drive means for said plunger to move its associated jaw and nut into seating engagement with said fixed jaw, and positive drive means for effecting the cracking movement of said plunger.

6. In a nut cracking machine, a base having an upstanding flange, a feeder casing secured thereto and having an opening in one side thereof, a feed hopper supported by said base and casing and discharging into said opening of said casing, said casing having a hollow interior and inwardly extended hub members, a drum revolubly mounted upon one of said hub members, said drum having radially extended arms, nut pick-up spoons carried by said arms and of a length to travel through the opening of said casing, an internal ring gear carried by said drum, a drive shaft journalled in the hub portions of said casing and projecting upon opposite sides thereof, a gear fixed to said shaft, a gear carried by one of said hub members and in mesh with said last named gear and said ring whereby to rotate said drum and associated pick-up spoons, a chute carried by said casing, means for diverting nuts from said pick-up spoons to said chute, nut supporting arms disposed beneath said chute, nut gripping arms depending beneath said supporting arms and adapted to catch and hold a nut released by said supporting arms, a trip lever carried by one of said nut-supporting arms, a cam member fixed to said drive shaft and rotatable in the path of said trip lever, a fixed nut cracking jaw supported by said base, a second jaw movable relatively thereto, and including a plunger, bearing members carried by said base, a shaft journalled therein for oscillating movement, a segmental gear fixed to said shaft and having an arm, a second shaft revolubly mounted above said first named shaft, a gear mounted thereon and having a limited free rotary movement with respect thereto and adapted to mesh with said segmental gear at times, a rack bar upon said plunger, and said plunger further having friction pads upon the sides thereof, a gear carried by said second named shaft in mesh with said rack bar, a plate member carried by said first named shaft for support of said rack bar, drive plates fixed upon opposite sides of said plate and forcibly contacting said friction pads and a connecting rod fixed between said drive shaft and the arm carried by said oscillatable shaft.

7. In a nut cracking machine, a base, a fixed jaw supported thereby, a reciprocable jaw cooperable therewith and having a plunger member, a rack bar fixed thereto, friction pad members secured to the sides of said plunger, upper and lower transverse shafts journalled upon said base, said lower shaft having an oscillatory movement, a plate member keyed to said lower shaft and supporting said plunger, drive plates fixed to said plate member and in bearing contact with said friction pads, a segmental gear keyed to said lower shaft, a gear mounted upon said upper shaft and adapted to mesh with said segmental gear at times, said last named gear having a limited rotary movement with respect to its shaft, a second gear keyed to said upper shaft and in mesh with said rack bar, and means for oscillating said lower shaft.

8. In a nut cracking machine, a drive for a reciprocating cracking plunger, a supporting bearing therefor, friction pad members secured upon opposite sides of said plunger, and said plunger further having a rack bar upon its upper side, a pair of shafts disposed one above the other, a gear fixed to the upper shaft and in mesh with said rack bar, a second gear fixed to said shaft and having a hub, said hub having aligned apertures, a pin fixed to said shaft and projecting through said apertures, said apertures being of a width greater than the diameter of the pin whereby the gear may rotate a limited distance with respect to said shaft, spring means for holding the pin in engagement with certain side portions of the apertures, a plate member fixed to the lower shaft and in supporting engagement with said rack bar, drive plates carried by said plate member and in contact with said friction pads, and a segmental gear fixed to said lower shaft and adapted to mesh with said last named gear at times, and means for imparting motion to said lower shaft.

9. In a nut-cracking machine, a drive for a reciprocating cracking plunger, a supporting bearing therefor, friction pad members secured upon opposite sides of said plunger, and said plunger further having a rack bar upon its upper side, a pair of shafts disposed one above the other, a gear fixed to the upper shaft and in mesh with said rack bar, a second gear fixed to said shaft and having a hub, said hub having aligned apertures, a pin fixed to said shaft and projecting through said apertures, said apertures being of a width greater than the diameter of the pin whereby the gear may rotate a limited distance with respect to said shaft, spring means for holding the pin in engagement with certain side portions of the apertures, a plate member fixed to the lower shaft and in supporting engagement with said rack bar, drive plates carried by said plate member and in contact with said friction pads, cushion means carried by said plunger to prevent over-travel thereof, and a segmental gear fixed to said lower shaft and adapted to mesh with said last named gear at times, and means for imparting motion to said lower shaft.

10. In a nut cracking machine, a reciprocating nut cracking plunger, means for frictionally moving said plunger into engagement with a nut to be cracked, and positive drive means for exerting final cracking pressure upon said plunger, said last named drive means comprising a gear having limited free rotation, and a yieldingly supported segmental gear adapted to mesh with said gear after engagement of said plunger with a nut to be cracked.

11. In a nut cracking machine, a feed mechanism including a chute, a pair of oppositely rockable nut-supporting arms disposed therebeneath, a pair of oppositely rockable nut-gripping arms depending from said first named arms and having inwardly inclined end faces, a fixed jaw positioned in alignment and in advance of said gripping arms, means for operating each pair of arms in unison, a movable plunger having a cracker jaw and adapted to engage said inclined faces of said gripping arms to slightly open the same to allow the nut to adjust itself to the said cracker jaws, and means for reciprocating said plunger.

12. In a nut cracking machine, a feed mechanism, a nut cracking mechanism associated therewith and including a fixed jaw, a reciprocable plunger having a jaw cooperable with said fixed jaw, means for operating said plunger, friction means carried by said plunger, friction means carried by said operating means and engageable with said first named friction means whereby to move said plunger and associated jaw into engagement with a nut to be cracked and said operating means further having positive means for finally moving said plunger to crack the nut.

WILLIAM GEBHARDT.